(12) United States Patent
Imai et al.

(10) Patent No.: US 12,433,926 B2
(45) Date of Patent: Oct. 7, 2025

(54) BURDOCK SEED OIL-CONTAINING COMPOSITION AND METHOD FOR PRODUCING SAME

(71) Applicant: ROHTO Pharmaceutical Co., Ltd., Osaka (JP)

(72) Inventors: Momoko Imai, Osaka (JP); Takashi Shimizu, Osaka (JP)

(73) Assignee: ROHTO PHARMACEUTICAL CO., LTD., Osaka (JP)

( * ) Notice: Subject to any disclaimer, the term of this patent is extended or adjusted under 35 U.S.C. 154(b) by 0 days.

(21) Appl. No.: 19/169,459

(22) Filed: Apr. 3, 2025

(65) Prior Publication Data

US 2025/0228911 A1    Jul. 17, 2025

Related U.S. Application Data

(63) Continuation of application No. PCT/JP2023/036324, filed on Oct. 5, 2023.

(30) Foreign Application Priority Data

Oct. 6, 2022    (JP) ................ 2022-161418

(51) Int. Cl.
 *A61K 36/28*    (2006.01)
 *A61K 47/14*    (2017.01)

(52) U.S. Cl.
 CPC .............. *A61K 36/28* (2013.01); *A61K 47/14* (2013.01)

(58) Field of Classification Search
 None
 See application file for complete search history.

(56) References Cited

U.S. PATENT DOCUMENTS 9,072,718 B2    7/2015  Okubo et al.
2007/0166255 A1*  7/2007  Gupta ................ A61K 8/347
                                   514/754

FOREIGN PATENT DOCUMENTS

| CN | 106109358    | 11/2016 |
| CN | 111544348    | 8/2020  |
| KR | 10-2014-0004330 | 1/2014 |
| WO | 2012/043549  | 4/2012  |

OTHER PUBLICATIONS

Ikeda, et al., "Phase I trial of GBS-01 for advanced pancreatic cancer refractory to gemcitabine," *Cancer Sci*, vol. 107, 2016, pp. 1818-1824.
International Search Report dated Dec. 26, 2023, issued in PCT/JP2023/036324, with English translation thereof.
International Preliminary Report on Patentability dated Mar. 1, 2025, including Written Opinion dated Dec. 26, 2023, issued in PCT/JP2023/036324, with English translation thereof.

* cited by examiner

*Primary Examiner* — Robert A Wax
*Assistant Examiner* — Quanglong N Truong
(74) *Attorney, Agent, or Firm* — GREENBLUM & BERNSTEIN, P.L.C.

(57) ABSTRACT

The purpose of the present disclosure is to produce and provide a burdock seed oil-containing composition that is excellent in stability. The present disclosure relates to a composition containing (A) burdock seed oil and (B) triethyl citrate and containing 1 to 7.5 mass % of arctigenin derived from the component (A), and a method for producing the same.

8 Claims, No Drawings

BURDOCK SEED OIL-CONTAINING COMPOSITION AND METHOD FOR PRODUCING SAME

RELATED APPLICATIONS

This application is a continuation of International Application No. PCT/JP2023/036324, filed on Oct. 5, 2023, which claims priority to Japanese Patent Application No. 2022-161418, filed on Oct. 6, 2022, the entire contents of each of which are herein incorporated by reference.

TECHNICAL FIELD

The present disclosure relates to a burdock seed oil-containing composition and a method for producing the same.

BACKGROUND ART

It is known that burdock fruit, which is seed of burdock Arctum lappaLinne (Compositae) of the family Asteraceae, contains arctiin, namely a lignan glycoside, and arctigenin, namely an aglycone thereof. A method for producing a burdock fruit extract containing a high content of arctigenin from burdock fruit is known (WO 2012/043549 A).

The study on the stability of burdock seed oil, which is an extract of burdock seeds, was insufficient.

CITATION LIST

Patent Literature

Patent Literature 1: WO 2012/043549 A

SUMMARY

Technical Problem

The purpose of the present disclosure is to produce and provide a burdock seed oil-containing composition that is excellent in stability.

Solution to Problem

The present inventors have found that a composition containing (A) burdock seed oil and (B) an ester compound or glycol ether is stable. Then, the present disclosure has been completed.

The present disclosure provides a burdock seed oil-containing composition having excellent stability. In addition, the present disclosure provides a method for producing a burdock seed oil-containing composition having excellent stability.

That is, the present disclosure relates to a composition containing (A) burdock seed oil and (B) an ester compound or glycol ether.

Preferable aspects of the present disclosure are as follows:

[1] A composition containing (A) burdock seed oil, and (B) one or more compounds selected from the group consisting of triethyl citrate, diisopropyl adipate, diethyl sebacate, and phenoxyethanol;

[2] The composition according to [1], in which arctigenin derived from the component (A) has a content of 1 to 7.5 mass %;

[3] The composition according to [1] or [2], in which arctigenin derived from the component (A) has a content of 2 to 15 mass % based on a total amount of the component (A);

[4] The composition according to any one of [1] to [3], in which (B) the one or more compounds selected from the group consisting of triethyl citrate, diisopropyl adipate, diethyl sebacate, and phenoxyethanol have a content of 10 to 90 mass %;

[5] A method for producing a composition, including a step of blending (A) burdock seed oil and (B) one or more compounds selected from the group consisting of triethyl citrate, diisopropyl adipate, diethyl sebacate, and phenoxyethanol;

[6] The method for producing a composition according to [5], including a step of blending the component (A) so that arctigenin derived from the component (A) has a content of 1 to 7.5 mass %;

[7] The method for producing a composition according to [5] or [6], in which arctigenin derived from the component (A) has a content of 2 to 15 mass % based on a total amount of the component (A);

[8] The method for producing a composition according to any one of [5] to [7], in which (B) the one or more compounds selected from the group consisting of triethyl citrate, diisopropyl adipate, diethyl sebacate, and phenoxyethanol have a content of 10 to 90 mass %;

[9] A method for producing a composition, including a step of blending (A) burdock seed oil and (B) one or more compounds selected from the group consisting of triethyl citrate, diisopropyl adipate, diethyl sebacate, and phenoxyethanol, in which highly concentrated arctigenin is included in the burdock seed oil;

[10] An external preparation or an oral preparation including the composition according to any one of [1] to [4], in which the burdock seed oil is an active ingredient;

[11] An external preparation or an oral preparation including the composition according to [2] or [3], in which arctigenin is an active ingredient;

[12] The composition according to any one of [1] to [4], in which the composition is substantially free of arctiin derived from the burdock seed oil (A);

[13] The method for producing a composition according to any one of [5] to [9], in which the composition is substantially free of arctiin derived from the burdock seed oil (A); and

[14] The external or oral preparation according to [10] or [11], in which the preparation is substantially free of arctiin derived from the burdock seed oil (A).

Advantageous Effects

The burdock seed-containing composition of the present disclosure contains (A) burdock seed oil and (B) an ester compound or glycol ether, so that the stability is excellent.

DESCRIPTION OF EMBODIMENTS

Hereinafter, embodiments for carrying out the present disclosure will be described in detail. However, the present disclosure is not limited to the following embodiments.

[1. Composition]

The composition of the present disclosure is a composition containing (A) burdock seed oil and (B) an ester compound or glycol ether, and arctigenin derived from the component (A) has a content of preferably 1 to 7.5 mass %.

For example, the composition according to one embodiment is a composition containing (A) burdock seed oil and (B) one or more compounds selected from the group consisting of triethyl citrate, diisopropyl adipate, diethyl sebacate, and phenoxyethanol, and arctigenin derived from the component (A) has a content of 1 to 7.5 mass %.

<Component (A)>

The burdock seed oil is not particularly limited as long as the oil is obtained from seeds of Arctum lappaLinne (Compositae) of the family Asteraceae. The oil can preferably be obtained by extraction from burdock seeds. For example, the burdock seed oil may be produced and obtained by the method described below, or commercially available burdock seed oil may be used. One kind may be used singly, or two or more kinds may be used in combination.

The content of the component (A) in the composition according to this embodiment is not particularly limited, and is appropriately set according to the type and content of other components blended, the use and the preparation form of the composition, and the like. Regarding the content of the component (A), from the viewpoint of more significantly exerting the effect of the present disclosure, the total content of the component (A) based on the total amount of the composition may be, for example, 10 to 90 mass %, 20 to 80 mass %, preferably 30 to 70 mass %, more preferably 35 to 65 mass %, still more preferably 40 to 60 mass %, even more preferably 45 to 60 mass %, and particularly preferably 45 to 55 mass %.

The composition according to this embodiment contains arctigenin. The content of arctigenin is not particularly limited, and is appropriately set according to the type and content of other components blended, the use and the preparation form of the composition, and the like. Regarding the content of arctigenin, from the viewpoint of more significantly exerting the effect of the present disclosure, the total content of arctigenin based on the total amount of the composition may be, for example, 1 to 7.5 mass %, 1 to 6 mass %, preferably 1 to 5.5 mass %, more preferably 1 to 5 mass %, still more preferably 1.5 to 4.5 mass %, even more preferably 2 to 4 mass %, and particularly preferably 2.5 to 3.5 mass %.

The composition according to this embodiment contains arctigenin derived from the component (A). Regarding the content of arctigenin derived from the component (A), from the viewpoint of more significantly exerting the effect of the present disclosure, the total content of arctigenin derived from the component (A) based on the total amount of the component (A) may be, for example, 2 to 15 mass %, 2 to 12 mass %, preferably 2 to 11 mass %, more preferably 2 to 10 mass %, still more preferably 3 to 9 mass %, even more preferably 4 to 8 mass %, and particularly preferably 5 to 7 mass %. The content of arctigenin derived from the component (A) is not particularly limited, and is appropriately set according to the type and content of other components blended, the use and the preparation form of the composition, and the like.

<Component (B)>

From the viewpoint of more significantly exerting the effect of the present disclosure, the component (B) is preferably an ester compound or glycol ether, more preferably a $C_{10-30}$ ester or a $C_{4-15}$ glycol ether, and still more preferably a $C_{12-27}$ ester or a $C_{4-8}$ glycol ether. Even more preferred is a $C_{12-27}$ triester (e.g., ($C_{12}$) triethyl citrate, ($C_{27}$) glyceryl hexanoate (triethylhexanoin)); a $C_{12-14}$ diester (e.g., ($C_{12}$) isopropyl adipate, ($C_{14}$) diethyl sebacate); or a $C_{4-8}$ glycol ether (e.g., ($C_4$) butylene glycol, ($C_6$) diethylene glycol monoethyl ether (ethoxy diglycol), ($C_6$) methoxymethylbutanol, ($C_8$) ethylene glycol monophenyl ether (phenoxyethanol)). The component (B) has fluidity allowing for stirring and mixing with the component (A) at 20 to 80° C. As the component (B), a commercially available product may be used. One kind of the component (B) may be used singly, or two or more kinds thereof may be used in combination. The component (B) is not particularly limited as long as the component is conventionally used in the technical field. Examples of the component (B) include, but are not limited to, one or more compounds selected from the group consisting of triethyl citrate, diisopropyl adipate, diethyl sebacate, and phenoxyethanol. Alternatively, triethyl citrate can be contained singly. At least triethyl citrate may be contained and one or more compounds selected from the group consisting of diisopropyl adipate, diethyl sebacate, and phenoxyethanol may be further contained.

The content of the component (B) in the composition according to this embodiment is not particularly limited, and is appropriately set according to the type of the component (B), the type and content of other components blended, the use and the preparation form of the composition, and the like. Regarding the content of the component (B), from the viewpoint of more significantly exerting the effect of the present disclosure, the total content of the component (B) based on the total amount of the composition may be, for example, 10 to 90 mass %, 20 to 80 mass %, preferably 30 to 70 mass %, more preferably 35 to 65 mass %, still more preferably 40 to 60 mass %, even more preferably 45 to 60 mass %, and particularly preferably 45 to 55 mass %.

(Other Components)

In addition to the components (A) and (B), other components can be further added to the composition according to this embodiment.

It is preferable that the composition according to this embodiment is free of or substantially free of arctiin. Here, "substantially free of" means that the amount of arctiin in the composition is 0.01 mass % or less, preferably 0.001 mass % or less, and more preferably 0.0001 mass % or less.

[2. Method for Producing Composition]

The component (A) contained in the composition according to this embodiment may be produced through a step of crushing burdock seeds, a step of subjecting burdock seeds to extraction to obtain burdock seed oil, a step of filtering burdock seed oil, a step of including highly concentrated arctigenin in burdock seed oil, a concentration step, a solid-liquid separation step, and the like. From the viewpoint of more significantly exerting the effect of the present disclosure, each step may be selected appropriately, and it is not necessary to include all the steps.

<Step of Crushing Burdock Seeds>

Burdock seeds may be crushed by known means, and a commercially available crusher can also be used. Commercially available burdock seeds crushed to any size (particle size) may be used. From the viewpoint of more significantly exerting the effect of the present disclosure, the arctigenin content of burdock seeds may be measured and burdock seeds suitable for the present disclosure may then be selected.

<Step of Subjecting Burdock Seeds to Extraction to Obtain Burdock Seed Oil>

Crushed burdock seeds and a solvent may be mixed for extraction under room temperature to high temperature conditions to obtain burdock seed oil. In the extraction step, water or an organic solvent (e.g., methanol, ethanol, propanol, acetone, oil) or a mixture thereof may be used, and the yield of arctigenin can be increased by preferably selecting a solvent having good compatibility with arctigenin. The solvent used may be a commercially available one. The extraction treatment used may be any known extraction process such as heating and stirring, heating and refluxing, drip extraction, immersion extraction, or pressure extraction. The temperature of the extraction treatment may be any temperature, but may be 35° C. or more, 40° C. or more, 50° C. or more, 55° C. or more, 60° C. or more, or 65° C. or more from the viewpoint of more significantly exerting the effect of the present disclosure. The temperature may also be 95° C. or less, 90° C. or less, 85° C. or less, 80° C. or less, or 75° C. or less. Although not limited, for example, 40 to 90° C. is preferable, 55 to 90° C. is more preferable, 60 to 85° C. is still more preferable, and 65 to 80° C. is even more preferable. The time for performing the extraction treatment is not limited, but is preferably 30 minutes or more, more preferably 35 minutes to 24 hours, still more preferably 45 minutes to 20 hours, and still more preferably 1 hour to 20 hours.

<Step of Filtering Burdock Seed Oil>

In order to remove unnecessary components from the extracted burdock seed oil, filtration may be performed as necessary. In order to determine the necessity of the filtration step, the components contained in the burdock seed oil may be analyzed and measured in advance. The filtration may be performed using a known method such as gel filtration, gel chromatography, thin layer chromatography, or a filter, and/ or a known apparatus.

<Step of Including Highly Concentrated Arctigenin in Burdock Seed Oil>

In order to include arctigenin at a high concentration in the burdock seed oil, it is preferable to convert arctiin contained in the burdock seed oil into arctigenin. Specifically, a process such as hydrolysis treatment, enzyme treatment, or reflux treatment may be performed, but is not limited thereto. The hydrolysis treatment is preferable from the viewpoint of more significantly exerting the effect of the present disclosure. The hydrolysis treatment may be promoted by, but is not limited to, adding an acid. The acid used at this time is preferably a strong acid, and for example, hydrochloric acid, nitric acid, or sulfuric acid may be used.

The reaction temperature in this step is 40° C. or more, 50° C. or more, 60° C. or more, or 65° C. or more, and may be 90° C. or less, 85° C. or less, 80° C. or less, or 75° C. or less. For example, 40 to 90° C. is preferable, 50 to 85° C. is more preferable, 60 to 80° C. is still more preferable, and 65 to 75° C. is even more preferable. The reaction time is not limited, but is preferably 30 minutes or more, more preferably 35 minutes to 24 hours, still more preferably 45 minutes to 20 hours, and even more preferably 1 hour to 20 hours.

<Concentration Step>

Known concentration processes may be used to remove the solvent contained in the extracted burdock seed oil. It is preferable to perform enrichment to a concentration at which the effect of the present disclosure is exerted.

<Solid-Liquid Separation Step>

In order to separate extraction residues from the extracted burdock seed oil, a known solid-liquid separation process such as filtration, precipitation, and centrifugation may be performed.

<Step of Mixing Component (A) and Component (B) to Obtain Composition>

The extracted burdock seed oil may be analyzed and measured by a known method to check the content of arctigenin. The component (A), the component (B), and other components as appropriate may be mixed to obtain a composition of the present disclosure. In production of the composition, although not limited, it is preferable to stir and mix the component (A) and the component (B) at a temperature of, for example, 20° C. to 80° C., preferably 20° C. to 60° C., and more preferably 20° C. to 40° C. The time for stirring and mixing is not limited, but may be 10 minutes to 10 hours, and preferably about 20 minutes to 5 hours. Here, the ratio between the component (A) and the component (B) is not limited, but the component (B) is preferably about 0.1 to 10 parts by mass, and more preferably 0.5 to 5 parts by mass based on 1 part by mass of the component (A). After the component (A) and the component (B) are mixed, analysis and measurement may be performed by a known method to check the content of arctigenin. Here, the ratio between the component (A) and the component (B) is not limited, but the component (B) is preferably about 0.1 to 10 parts by mass, more preferably 0.5 to 5 parts by mass, and still more preferably 0.5 to 1.5 parts by mass based on 1 part by mass of the component (A).

[3. External Preparation or Oral Preparation]

The composition according to this embodiment may be an external preparation or an oral preparation. An external preparation or oral preparation containing the composition according to this embodiment may be prepared. The external preparation means a form applied to the outer surface of an organism. The oral preparation means a form in which the oral preparation is taken into the body from the mouth of an organism and applied.

In addition to the components (A) and (B), the composition of this embodiment or the external preparation containing the composition of this embodiment may further contain one or two or more components such as a whitening component, an anti-inflammatory component, an antibacterial component, a cell activating component, an astringent component, an antioxidant component, an anti-aging component, or a moisturizing component as long as the effect of the present disclosure is not impaired. Each of these components is not particularly limited as long as the component is conventionally used as a component of an external preparation for skin in the fields of pharmaceuticals, quasi-drugs, or cosmetics or may be used in the future, and any component can be appropriately selected and used.

The composition of this embodiment or the oral preparation containing the composition of this embodiment may contain a pharmacologically active ingredient or a physiologically active ingredient in addition to the components (A) and (B) as long as the effect of the present disclosure is not impaired. One kind of the pharmacologically active ingredient or physiologically active ingredient may be used singly, or two or more kinds thereof may be used in combination. Further, the oral preparation may contain additives such as excipients, binders, disintegrants, lubricants, colorants, taste-masking agents, odor-masking agents, saccharides, sugar alcohols/polyhydric alcohols, high-intensity sweeteners, fats and oils, emulsifiers, thickeners, acidulants, and juices.

The external preparation or oral preparation may be used in the form of pharmaceuticals, cosmetics, or foods. As long as the effect of the present disclosure is not impaired, a known base agent or a carrier may be mixed therewith to prepare an external preparation or an oral preparation. Examples of the known form include: a liquid, a suspension, an emulsion, a cream, an ointment, a gel, a liniment, a lotion, an aerosol, a foam, powder, a cataplasm, a sheet in which a nonwoven fabric is impregnated with a drug solution, a stick such as a lipstick, a jelly, a syrup, granules, a troche, a chewable, a pill, a tablet, and a capsule.

[Method for Producing External Preparation or Oral Preparation]

In one embodiment of the present disclosure, it is also possible to provide a method for producing an external preparation or an oral preparation. The content of each component and other conditions are in accordance with the contents described in [1. Composition], [2. Method for producing composition], and [3. External preparation or oral preparation].

EXAMPLES

Hereinafter, the present disclosure will be specifically described based on Test Examples, but the present disclosure is not limited thereto. In addition, the blending amount in the following Examples and the like is represented in mass %.

Production Example 1

Ground and crushed burdock seeds were charged into a sufficient amount of 98% aqueous ethanol solution and stirred at 40° C. for 18 hours. The resulting liquid was allowed to stand at room temperature to precipitate a residue of burdock seeds. The supernatant was collected to obtain burdock seed oil (step of subjecting burdock seeds to extraction to obtain burdock seed oil). Filtration was performed using a pad with silica gel and Celite at a blending ratio of 2:1.

The amounts of arctigenin and arctiin contained in the obtained burdock seed oil were measured by a high performance liquid chromatography method. As a result, the amount of arctigenin was 1.1 mass %, and the amount of arctiin was 19.3 mass % (step of filtering burdock seed oil). Sulfuric acid was added to the recovered burdock seed oil, and the resulting mixture was stirred at 70° C. for 18 hours for hydrolysis treatment. The pH of the burdock seed oil was adjusted to about 5.5 with a pH adjusting agent. Decolorizing charcoal was added to the burdock seed oil, and the mixture was stirred for 18 hours. Thereafter, filtration was performed using a Celite-made pad, and the liquid after filtration was washed with ethanol (step of including highly concentrated arctigenin in burdock seed oil). The burdock seed oil was concentrated using a rotary evaporator (at 30° C.) and allowed to stand in an oven for 12 hours (at 22° C.) to precipitate a residue of the burdock seed oil. The separated oil phase was isolated from the solid phase and dried in a vacuum oven overnight (concentration step, solid-liquid separation step). The amounts of arctigenin and arctiin contained in the obtained burdock seed oil were measured by a high performance liquid chromatography method. As a result, the amount of arctigenin was 5.4 mass %, and arctiin was not detected.

Examples and Comparative Example

The burdock seed oil (A) obtained in Production Example 1 and the component (B) were weighed as indicated in Table 2, and put into a cylindrical beaker made of polyethylene. The component (A) and the component (B) were stirred and mixed at room temperature for 30 minutes to prepare each composition of Examples. Only the burdock seed oil (A) obtained in Production Example 1 was used as a composition of Comparative Example. Note that the component (B) in the table means that all are 100% of each component indicated.

Test Example 1

The burdock seed oil (A) obtained in Production Example 1 and the component (B) were weighed as indicated in Table 1, and put into a glass beaker. The component (A) and the component (B) were stirred and mixed at room temperature for 30 minutes, and then transferred to a cylindrical container made of polyethylene terephthalate. The container was sealed by closing a screw type lid. After each composition was allowed to stand at 4° C. for 1 week, the appearance was observed for the stability of the composition. When the vicinity of the bottom surface was viewed from the lateral side surface of the container, the test liquid without precipitation was evaluated as ⊙, the test liquid with slight precipitation was evaluated as ○, and the test liquid with precipitation and color gradation (non-uniformity) was evaluated as X. The results are shown in Table 1.

TABLE 1

| | (mass %) | | | | |
| --- | --- | --- | --- | --- | --- |
| Component name | Comparative Example 1-1 | Example 1-1 | Example 1-2 | Example 1-3 | Example 1-4 |
| (A) Burdock seed oil (Production Example 1) | 100 | 50 | 50 | 50 | 50 |
| (B) Triethyl citrate | — | 50 | — | — | — |
| (B) Diisopropyl adipate | — | — | 50 | — | — |
| (B) Diethyl sebacate | — | — | — | 50 | — |
| (B) Phenoxyethanol | — | — | — | — | 50 |
| Total amount | 100 | 100 | 100 | 100 | 100 |
| Stability | X | ⊙ | ○ | ○ | ⊙ |

As shown in Table 1, the composition containing only burdock seed oil (Production Example 1) (Comparative Example 1-1) had low stability after allowed to stand at 4° C. for 1 week. It was found that the composition containing burdock seed oil (Production Example 1) and the component (B) (Examples 1-1 to 1-4) was highly stable.

Test Example 2

After each composition was prepared and then allowed to stand for 5 minutes, the appearance was observed for the stability of the composition. When the composition was viewed from the lateral side of the beaker, the test liquid in which a region where color gradation (non-uniformity) occurred was not observed was evaluated as ⊙, the test liquid in which a region where color gradation occurred was less than 50% was evaluated as ○, the test liquid in which a region where color gradation occurred was 50% or more but separation between the component (A) and the component (B) was not observed was evaluated as Δ, and the test liquid in which separation between the component (A) and the component (B) was observed was evaluated as X.

Even when a region where color gradation occurred was not observed, the test liquid in which separation between the component (A) and the component (B) was observed was evaluated as X. The results are shown in Table 2.

TABLE 2

| Component name | Example 2-1 | Example 2-2 | Example 2-3 | Example 2-4 | Example 2-5 | Example 2-6 | (mass %) Example 2-7 |
|---|---|---|---|---|---|---|---|
| (A) Burdock seed oil (Production Example 1) | 50 | 50 | 50 | 50 | 50 | 50 | 50 |
| (B) Triethyl citrate | 50 | — | — | — | — | — | — |
| (B) Tri(2-ethylhexanoic acid) glyceryl | — | 50 | — | — | — | — | — |
| (B) Diisopropyl adipate | — | — | 50 | — | — | — | — |
| (B) Diethyl sebacate | — | — | — | 50 | — | — | — |
| (B) Diethoxyethyl succinate | — | — | — | — | 50 | — | — |
| (B) Phenoxyethanol | — | — | — | — | — | 50 | — |
| (B) 1,3-Butylene glycol | — | — | — | — | — | — | 50 |
| Total amount | 100 | 100 | 100 | 100 | 100 | 100 | 100 |
| Stability | ⊙ | Δ | ○ | ○ | Δ | ⊙ | Δ |

Test Example 3

First, 50 g of Example 2-1 was weighed and put into a polypropylene container, which was sealed by closing a screw type lid (filling rate of the test liquid in the container was 90%). The composition was allowed to stand at 60° C. for 2 weeks (heat treatment).

The arctigenin content of Example 2-1 after the heat treatment was measured by a high performance liquid chromatography method. The same test was performed for Example 2-6. The results are shown in Table 3.

TABLE 3

(mass %)

| Component name | Example 2-1 | Example 2-6 |
|---|---|---|
| (A) Burdock seed oil (Production Example 1) | 50 | 50 |
| (B) Triethyl citrate | 50 | — |
| (B) Phenoxyethanol | — | 50 |
| Total amount | 100 | 100 |
| Arctigenin content after heat treatment | 2.7 | 2.7 |

As shown in Table 3, the arctigenin content was 2.7 mass % after heat treatment of the composition containing burdock seed oil and triethyl citrate (Example 2-1). This means that the content of arctigenin derived from the component (A) based on the total amount of burdock seed oil (A) is 5.4 mass %. From the fact that burdock seed oil containing 5.4 mass % of arctigenin was produced in Production Example 1, it has been revealed that the content of arctigenin in the composition of the present disclosure is not changed by heat treatment, and the composition is thus highly stable. Also in the test liquid containing phenoxyethanol as the component (B) (Example 2-6), it was found that the stability of arctigenin was high as in Example 2-1.

The invention claimed is:

1. A composition comprising:
   (A) burdock seed oil; and
   (B) one or more compounds selected from the group consisting of triethyl citrate, diisopropyl adipate, diethyl sebacate, and phenoxyethanol;
   wherein arctigenin derived from the component (A) has a content of 1 to 7.5 mass %, and
   wherein the component (B) is the triethyl citrate.

2. The composition according to claim 1, wherein the triethyl citrate has a content of 10 to 90 mass %.

3. A method for producing a composition, comprising blending (A) burdock seed oil and (B) one or more compounds selected from the group consisting of triethyl citrate, diisopropyl adipate, diethyl sebacate, and phenoxyethanol;
   wherein the component (A) is blended so that a content of arctigenin derived from the component (A) is from 1 to 7.5 mass %, and
   wherein the component (B) is the triethyl citrate.

4. A method for producing a composition, comprising:
   blending (A) burdock seed oil and (B) one or more compounds selected from the group consisting of triethyl citrate, diisopropyl adipate, diethyl sebacate, and phenoxyethanol;
   wherein arctigenin is included at a content of 2 to 15 mass % into the burdock seed oil.

5. The method for producing a composition according to claim 3,
   wherein the triethyl citrate has a content of 10 to 90 mass %.

6. The method for producing a composition according to claim 4,
   wherein the triethyl citrate has a content of 10 to 90 mass %.

7. A method for producing an external preparation or an oral preparation, comprising blending the composition according to claim 1.

8. A method for producing an external preparation or an oral preparation, comprising blending the composition according to claim 2.

* * * * *